H. M. GLOVER.
HARROW.
APPLICATION FILED AUG. 4, 1913.
1,100,237. Patented June 16, 1914.
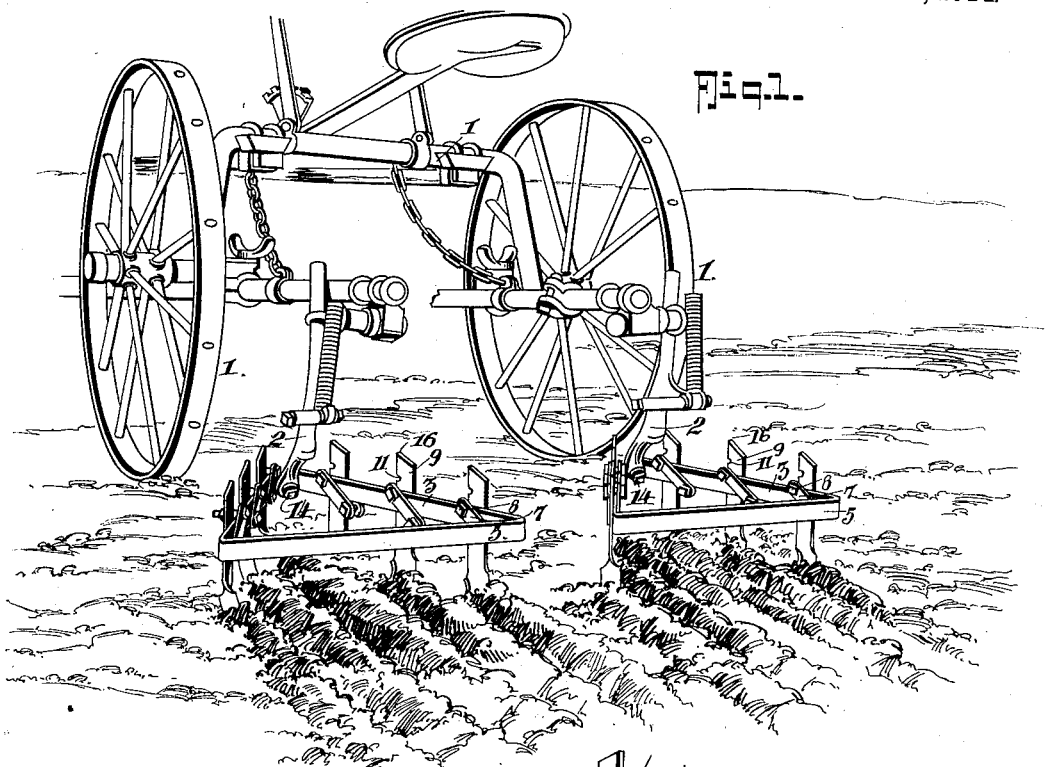
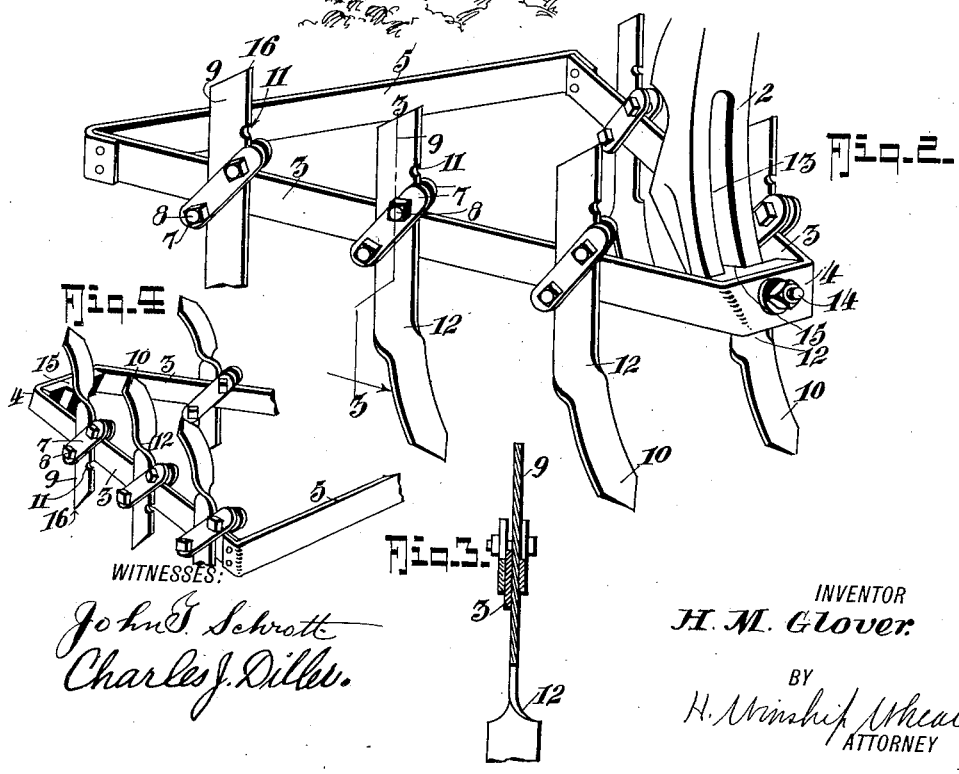
INVENTOR
H. M. Glover.

UNITED STATES PATENT OFFICE.

HENRY M. GLOVER, OF GOLDTHWAITE, TEXAS.

HARROW.

1,100,237.  Specification of Letters Patent.  Patented June 16, 1914.

Application filed August 4, 1913. Serial No. 782,840.

*To all whom it may concern:*

Be it known that I, HENRY M. GLOVER, residing at Goldthwaite, in the county of Mills and State of Texas, have invented certain new and useful Improvements in Harrows, of which the following is a specification.

My invention relates to certain new and useful improvements in harrows, and the invention particularly has for its object to provide a simple, inexpensive attachment that can be applied to the foot of the ordinary cultivator, one section of the attachment being applicable to one side of the cultivator while another section is applicable to the other side of the cultivator so that one section will run on one side of the drill and the other section on the other side of the drill plowing a full row at a time, it being of course understood that the cultivator blades are first removed in order to accommodate my invention.

Generically the invention resides in providing a simple frame of general triangular form on which the harrow teeth are horizontally and vertically adjustable so that they can be set at any desired position in a short space of time and with but little labor.

In its more subordinate nature, the invention includes those novel details of construction, combination and arrangement of parts, all of which will be first fully described, and then be specifically pointed out in the appended claims, reference being had to the accompanying drawings, in which—

Figure 1 is a perspective view showing one way of applying my invention. Fig. 2 is a perspective view of one of the combination plow and harrow sections or units, the same being shown applied on the foot of the cultivator. Fig. 3 is a cross section on the line 3—3 of Fig. 2. Fig. 4 is a detail perspective, parts being broken away showing a different adjustment of the teeth.

In the drawing, 1 represents the cultivator which may be of the ordinary type, and to the foot 2 of which the combination plow and harrow sections are secured in any desired manner so as to lie one at each side of the drill, the preferable manner of securing being shown in Fig. 2 of which further description will be made. Each section includes a frame of strap-like metal consisting of the rear bar 5, the front cross bar 4, and the side bars 3, which side bars lie at acute angles to the rear bar 5 and are connected by said rear bar as is clearly shown in Fig. 2. The bars 3—3 carry the reversible harrow teeth. The teeth 9 are adjustably clamped to the bars 3 by clamping plates 7 and bolts and nuts 8, and if found desired, the teeth 9 may be provided with notches 11 to engage the bolts 8 for purposes of adjustment. The lower end of each tooth 9 is bent at right angles as at 12, with the upper portion of said tooth and extends under the bars 3—3, said bent over part forming a toothed or penetrating end 10 of any desired configuration, its purpose being to enter and plow the ground. By reason of the quarter twisting of the teeth 9, as at 12, a resilient end is provided which is desirable in this class of tools for the kind of work it is intended for.

As before mentioned the attachment is fastened to the foot of the cultivator. This foot is usually provided with a slot 13 through which the cultivator blades are bolted, but on being removed to accommodate my improvement, the slot is utilized for the reception of a bolt 14 and a tongue 15 through which mediums the harrow is firmly and easily attached.

The teeth as shown in Fig. 1 are used for plowing the ground but may be reversed as shown in Fig. 4 so that the device may be used as a harrow and for this reason the teeth 9 are sharpened or pointed, as at 16.

In practice for adjustment, the nuts and bolts 8 are loosened up and the teeth 9 with bars 7 are slid along the frame bars 3 to the desired location, the teeth being raised or lowered as desired by changing their positions with relation to the bolts 8 and clamps 7.

From the foregoing description taken in connection with the accompanying drawing it is thought the complete construction, operation and advantages of the invention will be apparent to those skilled in the art.

What I claim is:—

1. An attachment for cultivators, comprising a triangular frame formed of strap bar, a member having a tongue secured in the front end of the frame, which tongue is adapted to enter the slot of a cultivator standard, and harrow teeth mounted on said frame.

2. The combination with a cultivator including a standard, the lower end of which is curved forwardly and longitudinally slotted, of a triangular frame of strap-bar, and a tongue carrying member secured in the front apex end of said frame to enter said standard slot, and a bolt passing through said frame, said tongue carrying member and said standard, for securing the same in place, together with harrow teeth mounted on said frame.

HENRY M. GLOVER.

Witnesses:
J. W. MASON,
M. E. ARCHER.